(12) United States Patent
Longman et al.

(10) Patent No.: US 9,288,312 B2
(45) Date of Patent: Mar. 15, 2016

(54) SYSTEM AND METHOD FOR MONITORING INCOMING TELEPHONE CALLS

(71) Applicant: CARE MONITORING 2000 LIMITED, Birmingham, West Midlands (GB)

(72) Inventors: Peter Longman, Birmingham (GB); Chris Jackson, Birmingham (GB)

(73) Assignee: CARE MONITORING 2000 LIMITED, Birmingham, West Midlands (GB)

(*) Notice: Subject to any disclaimer, the term of this patent is extended or adjusted under 35 U.S.C. 154(b) by 0 days.

(21) Appl. No.: 14/541,679

(22) Filed: Nov. 14, 2014

(65) Prior Publication Data

US 2015/0139412 A1    May 21, 2015

Related U.S. Application Data

(63) Continuation-in-part of application No. 13/988,001, filed on May 16, 2013.

(51) Int. Cl.
| | |
|---|---|
| *H04M 11/00* | (2006.01) |
| *H04M 1/56* | (2006.01) |
| *H04M 15/06* | (2006.01) |
| *H04M 3/42* | (2006.01) |

(52) U.S. Cl.
CPC ...... *H04M 3/42042* (2013.01); *H04M 3/42059* (2013.01); *H04M 3/42195* (2013.01)

(58) Field of Classification Search
CPC ............. H04M 2203/2016; H04M 2203/2072; H04M 2242/42; H04M 3/42042; H04M 3/42059
USPC .............. 379/38, 63.01, 106.01, 106.02, 133, 379/140, 142.05, 142.1, 142.15, 913; 705/7, 30, 32
See application file for complete search history.

(56) References Cited

U.S. PATENT DOCUMENTS

| | | | | |
|---|---|---|---|---|
| 6,587,551 | B2* | 7/2003 | Longman et al. | 379/106.02 |
| 6,771,764 | B1* | 8/2004 | Dezonno | 379/265.02 |
| 6,950,505 | B2* | 9/2005 | Longman et al. | 379/106.02 |
| 7,050,810 | B2* | 5/2006 | Brusilovsky et al. | 455/445 |
| 8,320,542 | B2* | 11/2012 | Raj | 379/201.01 |
| 8,369,495 | B1* | 2/2013 | Mallenahally Channakeshava | 379/88.18 |
| 2002/0064260 | A1* | 5/2002 | Longman et al. | 379/106.02 |
| 2004/0076276 | A1* | 4/2004 | Longman et al. | 379/106.02 |
| 2007/0127635 | A1* | 6/2007 | Zellner et al. | 379/67.1 |

(Continued)

*Primary Examiner* — Binh Tieu
(74) *Attorney, Agent, or Firm* — Porzio, Bromberg & Newman, P.C.

(57) ABSTRACT

There is provided a monitoring system for monitoring incoming telephone calls, including telephone calls with different called numbers, the system comprising an electronic processor and an associated database containing caller details with corresponding telephone numbers and details regarding locations and/or people to visit with corresponding telephone numbers, the system being adapted to: detect the originating number of the caller and the called number to which the incoming call was made; to store the time, date and number of an incoming call the originating number of which has been detected and store data representing the number to which the incoming call was made; and to identify the location of the caller/person being visited by the caller corresponding to the detected called number by referring to the associated database, and to identify the identity of the caller corresponding to the originating number by referring to the associated database.

38 Claims, 9 Drawing Sheets

(56) References Cited

U.S. PATENT DOCUMENTS

2010/0295656 A1* 11/2010 Herickhoff ............ H04L 63/08 340/3.1

2014/0019184 A1* 1/2014 Herickhoff ............ H04L 63/08 705/7.19

* cited by examiner

SYSTEM AND METHOD FOR MONITORING INCOMING TELEPHONE CALLS

BACKGROUND OF THE INVENTION

1. Field of the Invention

The present invention concerns monitoring systems for monitoring whether or not a person has reached or left one or more selected destinations.

2. Description of Related Art

Examples of such systems are already known and are particularly useful in the expanding field of home caring. In recent years there has been a substantial increase in the number of elderly or incapacitated people who live in their own homes and are reliant on regular visits by carers. The carers can be employed by local authorities or independent organizations.

In either case it is important for management to be able to monitor the staff who carry out the actual visits in order to ensure that the visits are both actually made and also importantly, made at the right time.

Before the arrival of Computer Integrated Telephony (CTI) such monitoring would normally be carried out on the basis of time logs filled in by individual staff. More recently systems have involved a carer calling into a central office and inputting an identifying PIN number. A similar call on departure will identify the period at which the caller was at a particular address as Caller Line Identification (CLI) will supply the time, date and location of the calls.

A disadvantage of such a system is that calls actually have to be completed by being answered at the central office. This causes additional expense and also takes time.

It is known (as described in WO02/45394) to use a computer system that include databases and uses DNIS (Dialled Number Identification Service), which can identify a care worker from the number they have been told to dial on care visits and identify the location of the care worker by using caller line identification to identify the phone line from which they are making the call. By using a database of the telephone numbers supplied to, and names of, the carer workers along with a database of the telephone numbers of lines installed at the homes of clients that are being visited, both the identity and the location of carer can be identified from a single call. Beneficially these calls can be unanswered calls, thereby not requiring PIN number input (incurring zero cost per call).

A problem with systems according to WO02/4394 is that they rely on the use of fixed landline telephones at the home of each person being visited for the care workers location to be identified. Not all homes have a fixed landline. Where there is a fixed telephone, there may be a delay between a care worker entering a home and finding the telephone. Additionally, many people are now used to the speed and convenience of using a mobile telephone. There are numerous benefits of using a personal mobile telephone over a landline telephone belonging to somebody else. For example the location of the mobile telephone will be known and it will be easy to access; contact telephone numbers that are personally used frequently may be stored and easily accessed in a local memory; a local history of calls made by the call worker may be stored in the memory; and the interface may be efficient and familiar.

Time delays between a care worker arriving, leaving or performing an action and it being recorded can be very important. Some agencies will bill per minute or even second so it is important to minimise both inaccuracies in time monitoring and any wasted time.

A concern of the present invention is to provide a simple yet efficient monitoring system, which at least mitigates some or all of the above problems.

An embodiment of the invention provides a monitoring system in which incoming calls remain unanswered (uncompleted) i.e. no PIN numbers are initially required (or expenses incurred), and in which a call is returned automatically to the original caller.

SUMMARY OF THE INVENTION

The present invention preferably provides a solution to these problems whilst still giving the time/cost saving advantages of an unanswered calling system. In one aspect of the invention there is provided a monitoring system for monitoring incoming telephone calls, including telephone calls with different called numbers, the system comprising an electronic processor and an associated database containing caller details with corresponding telephone numbers and details regarding locations and/or people to visit with corresponding telephone numbers, the system being adapted to: detect the originating number of the caller and the called number to which the incoming call was made; to store the time, date and number of an incoming call the originating number of which has been detected and store data representing the number to which the incoming call was made; and to identify the location of the caller/person being visited by the caller corresponding to the detected called number by referring to the associated database, and to identify the identity of the caller corresponding to the originating number by referring to the associated database.

The present invention can be implemented by a computer program operating on a standard desktop computer. An aspect of the present invention thus provides a medium in which is stored processor implementable instructions for controlling a processor to carry out the method as hereinabove described. Further aspects of the invention will be apparent from the description and the claims.

The invention will be more fully described by reference to the following drawings.

BRIEF DESCRIPTION OF THE DRAWINGS

In order that the present invention may be more readily understood, an embodiment thereof will now be described by way of example and with reference to the accompanying drawings, in which.

DETAILED DESCRIPTION

Figure 1:
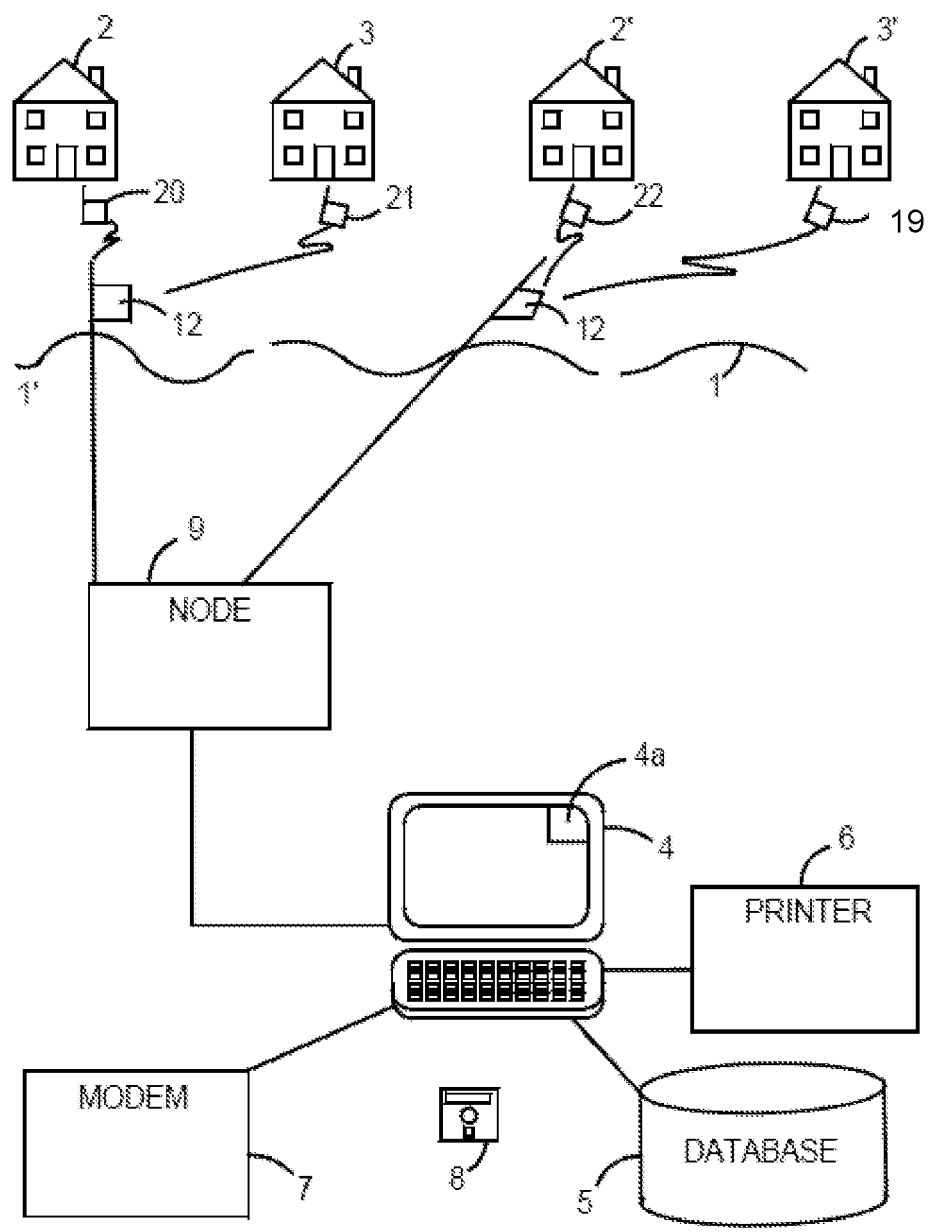
FIG. 1 shows a general overview of a monitoring system incorporating the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Whilst the following description is given in relation to a home caring situation it will be appreciated that there are many other situations where it is wished to monitor the visits of people to outside locations other than the home caring situation.

Figure 2:
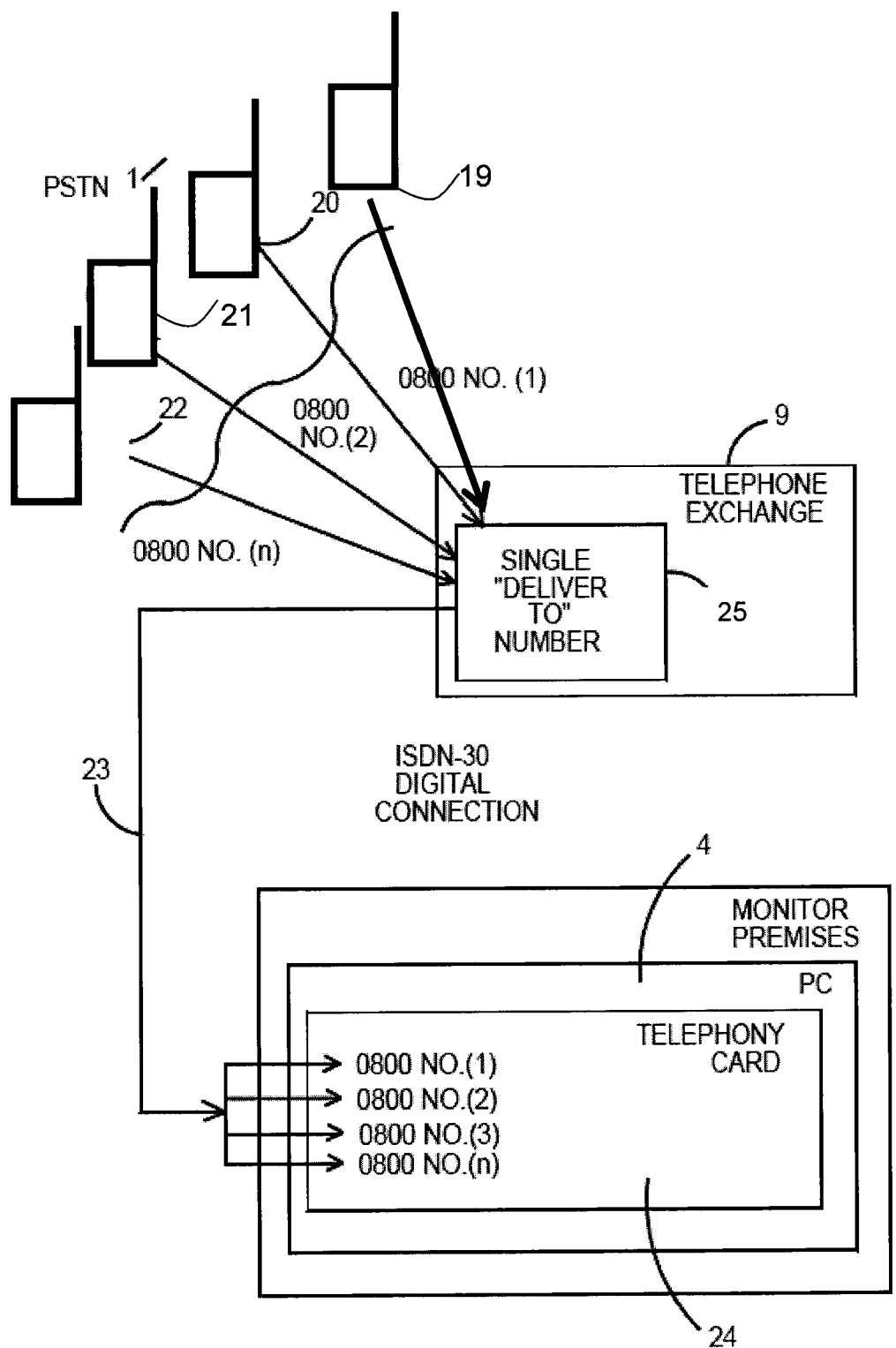
FIG. 2 is a block diagram showing some of the hardware of FIG. 1 in greater detail.

Referring now to FIGS. 1 and 2 of the accompanying drawings a mobile telephone network is shown at 1 comprising multiple base transceiver stations 12 which connects to a PSTN 1' (public service telephone network).

Preferably the network 1 allows a user to purchase a number, usually a 0800-number, which enables free calls to be made by the caller. Such numbers will be referred to hereinafter as "free call numbers". A caller dials the free call number and is then transferred to the call's final destination, which bears the cost of the call rather than the caller.

In addition the PSTN 1' supports what is known as DNIS (Dialed Number Identification Service). By means of the latter feature the recipient of a free call can not only (using CLI (Caller Line Identification)) identify the telephone from which the call was made, but also identify the number (such as an 0800 number) to which the call was made, i.e. the number dialed by the caller. Whilst free call numbers are preferred in many instances, they are not essential. It is possible to use direct dial-in numbers known as DDI numbers such as in an ISDN (Integrated Services Digital Network) system which direct dial numbers would carry a charge if a call were answered. Of course, where the call is unanswered there is no charge to the owner, generally the client, of the telephone from which the call was made. However, there is a benefit in using free call numbers where exceptionally a call is answered for example in order to deliver messages to a carer thereby avoiding any charge.

Present embodiments utilizing this DNIS feature together with the CLI information the caller and his location can be identified, without the need to answer a call.

Locations 2, 3, 2', 3' represent sites to be visited by a user of a monitoring system which house one or more clients needing care.

As shown in FIG. 1 the monitoring system uses a telephone exchange 9, and a computer 4 including programmable electronic processor 4a, a database 5, a printer 6 and communicator 7, such as a modem, whereby data can be sent to clients via the Internet. The database can, for example, comprise an external hard disk or internal memory space of the processor 4a.

Four mobile telephones 19, 20, 21 and 22 are shown connected to the mobile network 1.

The diagrammatic mobile telephones 19, 20, 21 and 22 each represent a different user with a different SIM (Subscriber Identity Module) card and therefore a different number with which they can be recognised by CLI. Four are shown, but the number of phones associated with exchange 9 is not limiting. Naturally each care worker will travel at least within his or her allocated region to a number of client locations 2, 3. In contrast to the system described WO02/45394 the locations 2 and 3 may not contain a telephone. The locations need not contain a telephone since the system makes use of the plurality of mobile telephones 20, 21 and 22 on which calls are made when at locations 2 and 3. Of course the system may be used in combination with a fixed landline and telephone.

As shown all the mobile telephones 19, 20, 21, 22 connect, via network 1 and PSTN 1', to the exchange 9 in such a manner that the exchange transfers the calls to a single number at the premises of the company carrying out the monitoring which hosts the computer 4 and database 5. This is performed by box 25 and the number is transferred to the premises such as via an ISDN-30 connection 23. At the premises an appropriate telephony card 24 in the computer 4 obtains the original (0800) or DDI numbers called using DNIS.

It should be appreciated that the system can operate without the use of 0800 . . . numbers or any other kind of "free call" number. Any number can be used provided that the caller has a number. The 0800 number prevents any misconception that the caller may be charged for the call.

It will be appreciated that the monitoring system to be described can be used in a number of different ways. Firstly an organization employing people who travel from place to place, such as home carers, can operate the system themselves. The monitoring system can also be used by one organization to monitor activities on behalf of one or more other organizations.

Figure 3:
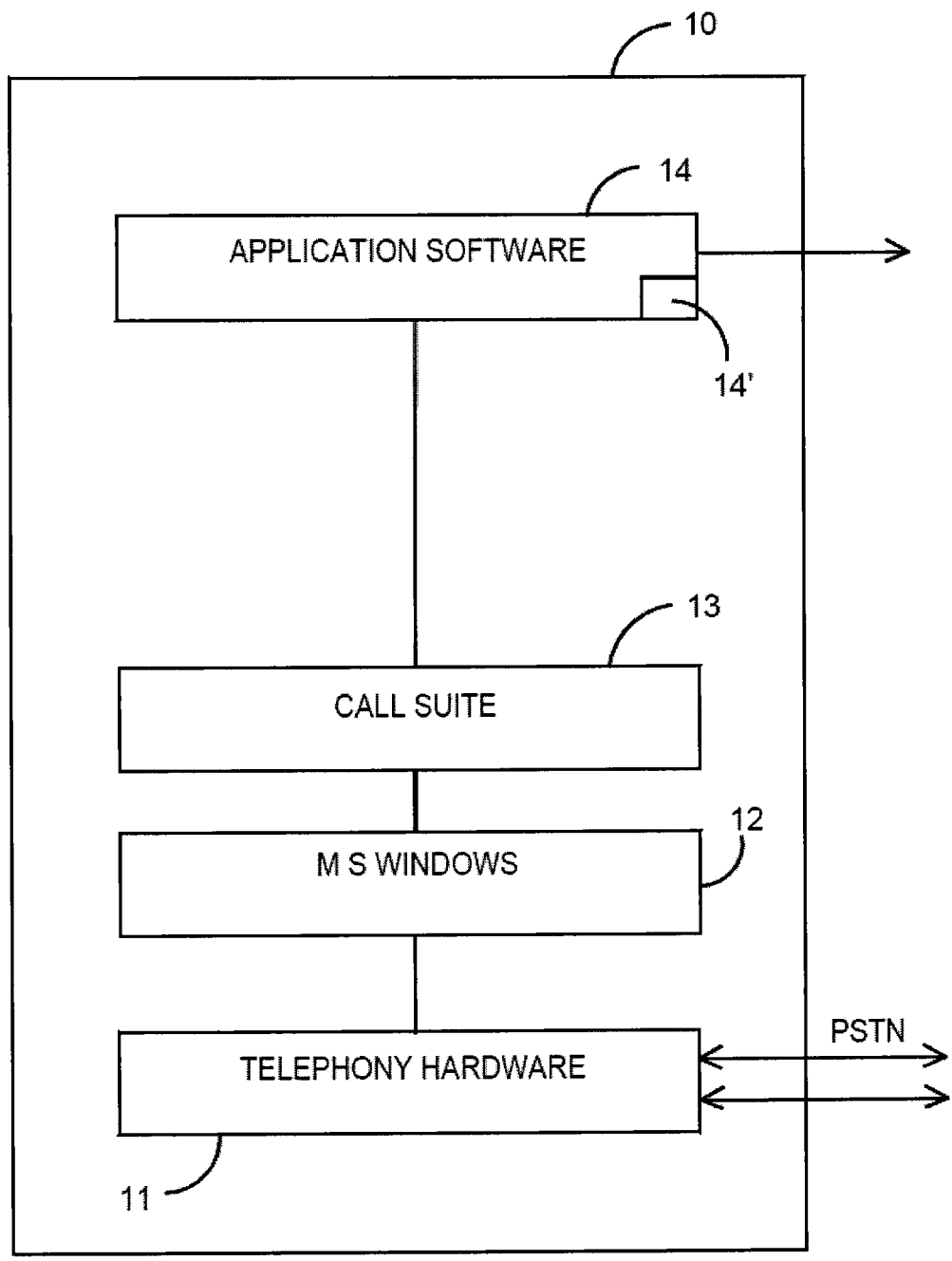
FIG. 3 is a block diagram of the hardware involved in the monitoring system of FIG. 1.

Referring now to FIG. 3 of the accompanying drawings, this shows in block form the functional organization of the monitoring system of FIG. 1.

In the present embodiment the main hardware is a personal computer generally indicated at 10 which can be an IBM® or IBM compatible computer operating in a Microsoft Windows® environment though of course both the type of computer is not essential and the operating system need not necessarily be Windows based. Alternative systems include DOS and UNIX.

The computer 10 is provided with a plug-in card 11 enabling the computer to receive calls from the telephone network 1. A typical card is a Dialogic pro-card, part numberD/300 JCT manufactured by the Dialogic Corporation of the USA. This plug-in card 11 interacts via Microsoft Windows (indicated at 12) with another software suite 13 such as the CT ADE product by Intel Corporation. The CT ADE Software provides a means of interacting with the PSTN through a programming environment such as Microsoft Visual Studio.

Each care worker who visits a given set of locations 2 and 3 is given or possesses their own mobile telephone 19, 20, 21, 22, each containing a different SIM and having a different telephone number associated with them. All of the mobile telephone numbers are stored in the database alongside the care worker's details.

Figure 4:
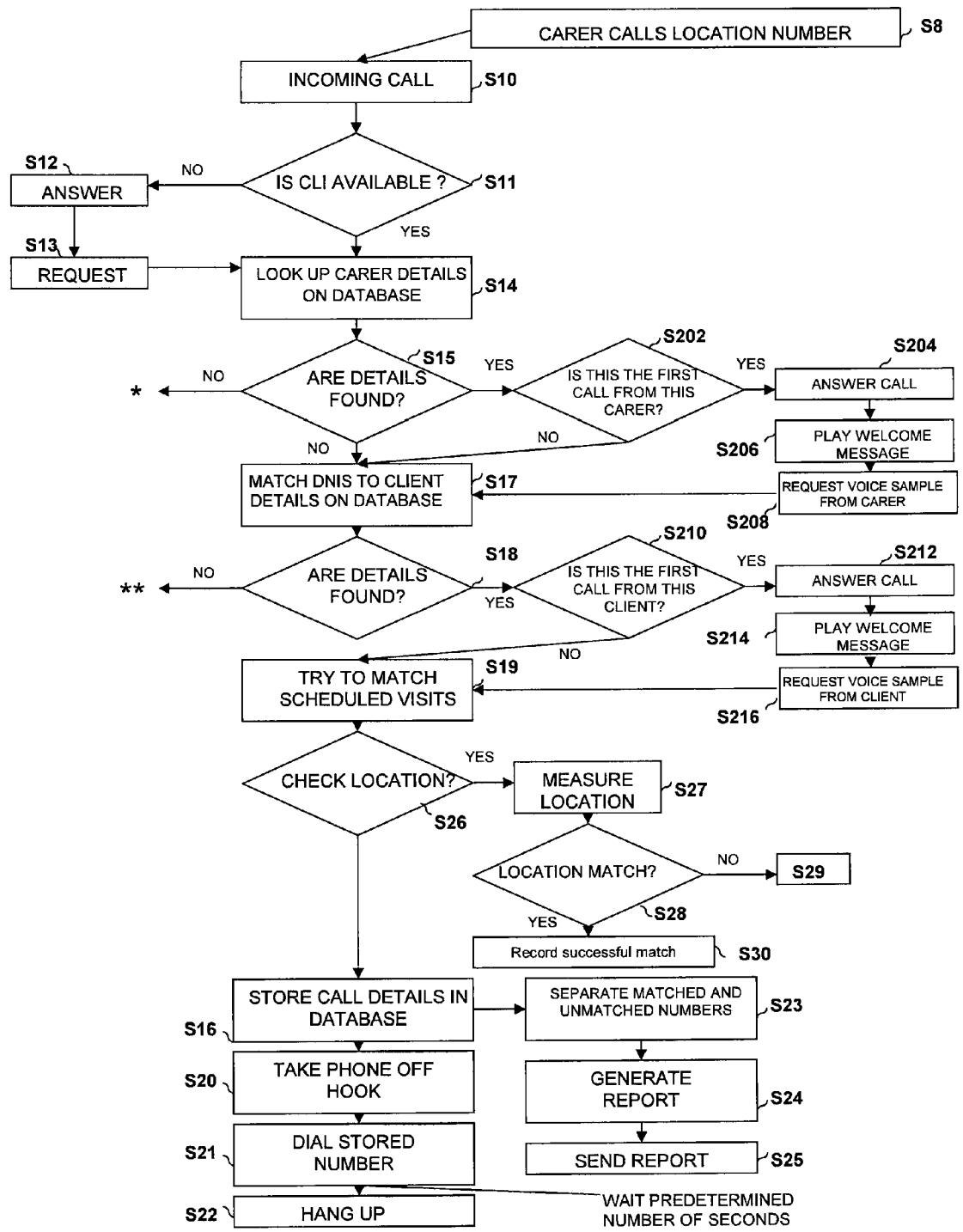
FIG. 4 is a flow diagram of the operation of application software for the hardware of FIG. 3.
Figure 4:
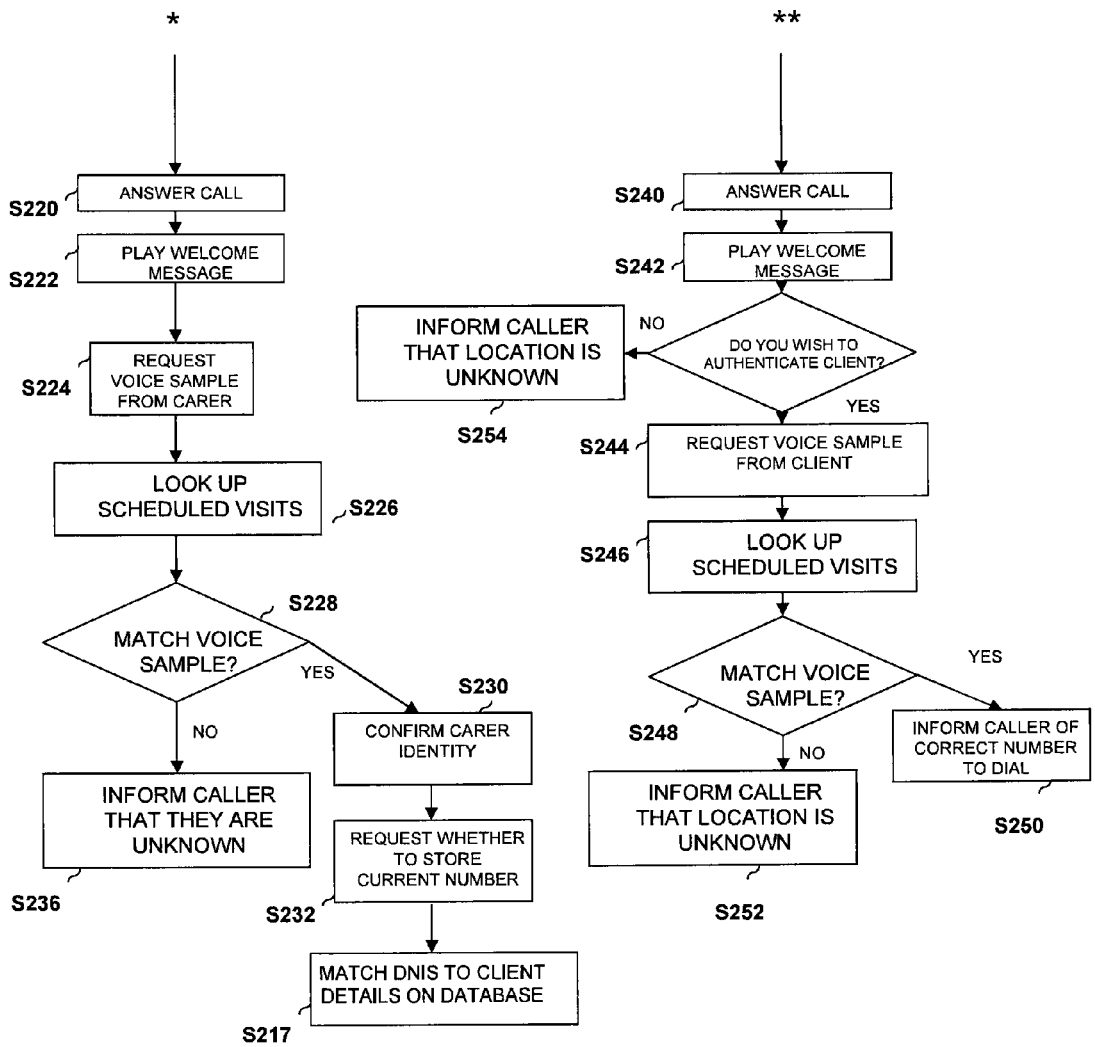

Turning now to the flowchart of FIG. 4, at step S8 a care worker uses his/her mobile telephone 20 to call a telephone number corresponding to the client/location 2 or 3 that they are visiting. Beneficially because the mobile telephone 19, 20, 21, 22 is carried by the care worker, the care worker may call the number immediately on entering the location 2 or 3 without any delay The telephone number which corresponds to the client/location 2 or 3 that they are visiting, might be, for example a standard number plus the last 3 digits of the Clients reference number, and might be displayed in the Client Care plan at a suitable position in the building at the location 2 or 3 that houses the client or on the Care workers mobile phone. The telephone numbers corresponding to, and preferably displayed in, each location 2 or 3 are included in the database 5 alongside details of the client present in that location and their care needs. Such telephone numbers that correspond to clients/locations may be only provided for locations, which have no fixed telephone with the process in FIG. 4 being used alongside a conventional process (such as those described in WO02/45394) for locations, which do have a fixed telephone. Alternatively the process in FIG. 4 or other process according to the invention may be used for all locations including any that have fixed telephones in order to benefit from the advantages of using mobile telephones.

After the call has been transmitted over the mobile telephone network 1 and the PSTN 1', the application software 14 receives notification of an incoming call from suite 13 at step S10. For the purposes of this flowchart it is assumed that DNIS is available. At step S11 the application software checks if CLI is available. If not, the call is answered at step S12 and a care worker is requested at step S13 to leave a voice message. In nearly all cases CLI should be available, if not the mobile phone 19, 20, 21, 22 can be re-programmed to ensure CLI is always available, and if so the process continues straight to step 14, the call is time logged and the source number corresponding to the SIM of the mobile telephone 20 identified. However the call is not answered and the circuit between the caller and the monitoring system 4 is not completed. This is achieved by the caller hanging up after step S8 within a short specified period, for example after two, three or four rings.

In either case data representing the carer's identity is entered at step S14. In this step the care worker's number as identified either by CLI or the voice message, is compared with care worker's details on the database 5. At step S15 a decision is made as to whether or not a match has been found in the database 5. If the incoming CLI number is not matched with a care worker who has been given a mobile telephone, the call is answered at step S220, a welcome message is played at S222 and a voice sample is requested at S224. Information associated with scheduled visits is then looked up and compared with the voice sample to see if there is a match between the carer and the schedule at S228. If there is a match, the carer is asked to confirm their identity at S230. The carer is then asked whether they would like to use the number that they are calling from as the stored number in the system at step S232. If they do, then the number is stored as the number associated with the carer in the database. Otherwise, the number that is associated with the carer will be reverted to the next time that they call. Once the carer's details have been confirmed, the process continues to match the DNIS to client details on the database at step S17 and the remainder of the process is performed. The details of the incoming call are stored at step S16 in the database 5, as there is a possibility that the monitoring system will not yet have been informed of a new carer mobile number.

If there is no match between the carer and the schedule, the carer is informed that they are not known on the system at S236.

If the CLI number of the incoming call is matched in step S15 then at step S202 it is assessed as to whether or not this is the first call from the carer and whether there is a voice sample on record for the carer. If it is not the first call from the carer, then the process moves to step S17. If at step S202 it is determined that this is the first call from the carer, the call is answered at step S204. A welcome message is played at step S206 and then at S208 a voice sample is requested from the carer. The process then moves to step S17, where DNIS is used to lookup the client/location details in the database 5. The voice sample requested at step S208 is compared with details relating to the carer that are stored in the database 5.

At step S17 DNIS is used to lookup the client location details in the database 5. The number called at step S8 which corresponds to a client/location 2 or 3 is diverted by box 22 in exchange 9 to a single number at step S10, but the original number called is recorded. The client/location details can include the telephone number of a telephone registered as being associated with that client/location. Usually this will be a fixed landline telephone located at the location of the client, but could be the client's mobile telephone.

If at step S18 a match cannot be found, the telephone call is answered at step 240, a welcome message is played at step S242. The caller is asked to authenticate the client. If the answer is yes, a voice sample is requested at step S244. The voice sample is looked up and compared with voice samples relating to the scheduled visits at S246. If there is a match, then the wrong number may have been dialled and the caller is informed of the correct number that should be dialled in relation to the client at S250. If there is no match between the voice sample and the scheduled visit, the caller is informed that this is the case at S252. If the caller is not able to authenticate the client, they are informed at step S254 that the location is unknown. The information is stored in the database 5 in step S16 as there is a possibility that the monitoring system will not yet have been informed of a new client number.

If at step S18 the details of the client are matched to the database 5, the process proceeds to step S210, where it is determined if this is the first call from the client. If it is the first call from the client, the call is answered at step S212, a welcome message is played at step S214 and a voice sample is requested from the client at S216. An attempt is then made to match at step S19 the time of the call with a schedule of times stored in database 5. The voice sample requested at step S216 is compared with details relating to the client that are stored in the database 5. Additionally the final details of the call are stored in the database. The final details will include the client location and the carer's identity if these were available.

If at step S210 it is determined that this is not the first call from the client, the process proceeds to an attempt to match the time of the call with a schedule of times stored in database 5.

At step S26 it is determined whether to check that the care worker is at the location they claim to be at. If it is determined to check the process continues to step S27.

Whether or not the location is to be checked, details of the call are stored at step S16. In order to minimise cost and/or time taken, in some systems step S27 occurs randomly on 10% of occasions. In other implementations the percentage can be anywhere between, and including 0 to 100%. Rather than occurring randomly, step S27 may occur after a set number of runs through step S26 summed for all, or at least a plurality of the care workers so that an individual care worker would not know when their next check at step S27 will occur.

At step S27 hardware or methods are used to verify if the care worker is at the location corresponding to the CLI number in conjunction with locator 14' (which in one form may be part of the application software 14). Examples of suitable hardware and processes are shown in FIGS. 5 to 8 and described below At step S28 the computer 4 compares the measured location details from step S26 with the details obtained from step S14. If the details match then this is recorded in memory and the process continues to step S30, where a successful match is recorded. If the details do not match, this is flagged by computer 4 at step S29. The actions taken after step S29, which might include disciplinary steps, can then be determined by the company based on the stored information and depending on their practice.

At step S20 the application software 14 takes the phone off-hook and at step S21 dials the stored telephone number of the care worker's mobile phone 20, waits a predetermined number of seconds when the dialled number rings and at step S22 hangs up without a call having ever been completed/answered. Steps S21 and S22 are sometimes referred to as the "ring back" process.

In many cases the monitoring system will be acting for a plurality of customers each of whom will have a number of people making regular visits and who will require to have regular reports on the dates, times and extent of the visits.

Thus at step S23 the application software separates matched and unmatched incoming numbers, collates at step S24 the matched number in accordance with the client to which they belong, generates data showing whether or not a matched call corresponds to a scheduled visit and generates one or more reports. These can be displayed, printed by the printer 6 for onward transmittal or sent at step S25 to the clients via the internet connection 7 or other suitable electronic media, e.g. leased line or dial-up modem.

It will be appreciated that at least steps S20, S23-S25 are optional and that the acquired data can be processed in other ways provided that information corresponding to CLI and DNIS is available or equivalent.

The monitoring system automatically returning a call to the originating number of the call at S21 is optional. Once again this call is not answered and the monitoring system is programmed to hang up after a short predetermined period, for example two rings. This sequence is carried out at the start of a visit. When the caller has completed his/her business at location 2, a call is once again made using mobile telephone 20 to the monitoring system, which follows the same procedure. Thus a clear record is made of both the start and end times of the visit. Again because the care worker carries the mobile telephone 20 they can make the exiting call simultaneously with exiting the location 2, the system provides more accurate results regarding the exact times and durations of visits.

The caller then proceeds to the next location, location 3, and the procedure repeated carrying their particular mobile telephone 20 with them.

By way of alternatives to the caller hanging up, the system can respond differently for example in order to give the caller assurance that the correct number has been dialled into the system without requiring a response call, though of course this may be given also. In one alternative, the system presents the caller with a busy tone after a predetermined number of rings such as two rings.

Whilst the forgoing description has been given with regard to the PSTN it will be appreciated that what has been described is equally applicable to a VoIP deployment whereby the monitoring system is itself located within LAN or a WAN connected to the PSTN through a VoIP.

The system can be used to notify the caller of whether they are making an arrival or departure call by varying the number of rings that the caller hears on ring-back at step S21 (e.g. 1 ring for arrival, 2 rings for departure). This works by programming the system to recognise where the caller is calling in for the first time from a particular number and then recognising where the caller is calling for the second time from that same number during the same visit. This can be done by matching calls to Care Plans or by ensuring that the caller makes all calls exactly in sequence i.e. 1 call in and 1 call out for every visit. It would assume that the correct number of calls were made for each visit for example.

Using digital or analogue telephone connections, it can be identified when a caller hangs up without the call being answered. By automatically recording a. when the call is first presented to the system, (that is the ring tones commence) and b. when the caller hangs up (the ring tones cease) it can be measured how long the calling party allowed their phone to ring the system number. Another advantage is that by knowing exactly when the calling party hangs up the system can immediately send the return call without any delay. This is an improvement on the existing system whereby the system sends a return call after a predetermined time period i.e. when it thinks the caller has hung-up.

By instructing users of the system to vary the length of time they allow the phone to ring for when calling the system, the different types of visit events can thus be readily identified. One useful application of this process is to record whether the caller is arriving at a client's home at the start of a visit or leaving a client's house at the end of a visit. So, for example, the caller could allow the phone to ring three times on arrival and five times on departure. In order to confirm to the caller that the system has correctly identified the visit type, the application software can be programmed to vary the number of times it makes the client's telephone ring during the ring back process. This could be the same number of times the caller rang or a different number e. g. two for arrival and three for departure. Again, in all cases, there is no requirement for either the initial call or confirmation call to be answered in order for visit details to be recorded. Calls can be connected, however, if desired.

In alternative embodiments, the call may be answered, by allowing it to be connected and by playing a message to the caller indicating that their call has been successfully logged. The detection and identification of the calling number still allows the identity of the caller to be established and the detection and identification of the called number still allows the location of the call to be identified from the records stored in a database, but also, by answering the call, confirmation is given to the caller by the played message, that the call has been received, thereby providing similar confirmation as step S21 but without the further telephone call of step S21. Whilst connection of the call in order to answer the call may incur an additional charge it can be beneficial to answer a call to confirm receipt, rather than issuing a return call in particular because (provided the message is suitably short) the total time spent to complete the process is reduced. In situations or areas where unanswered calls are charged at the same rate as an answered call the reduction in the total time in which the telephone is in use will also reduce costs.

The played message may be the same for every call or can impart further information such as whether the system has recorded the event as the start or end of a visit. The message may be computer generated by the system in real time (using speech synthesis or by selecting from pre-recorded phrases and names), and such computer generated calls can feed back the identifications made from the records stored in the database. For example the message may inform the caller as to the location the call has been identified as coming from and the name of the caller that has been identified. If the caller notices errors in the information that they can seek to have those errors corrected. The played message may be combined with the message of any or all of the messages played in steps S206, S214, S222, or S242 if it has been determined to provide any or all of those steps. In a further embodiment step S21 may be provided for any calls in which call from step S10 is unanswered, but not provided if the call has been answered at any point such as steps S204, S220, S212, or S240.

Figure 8:
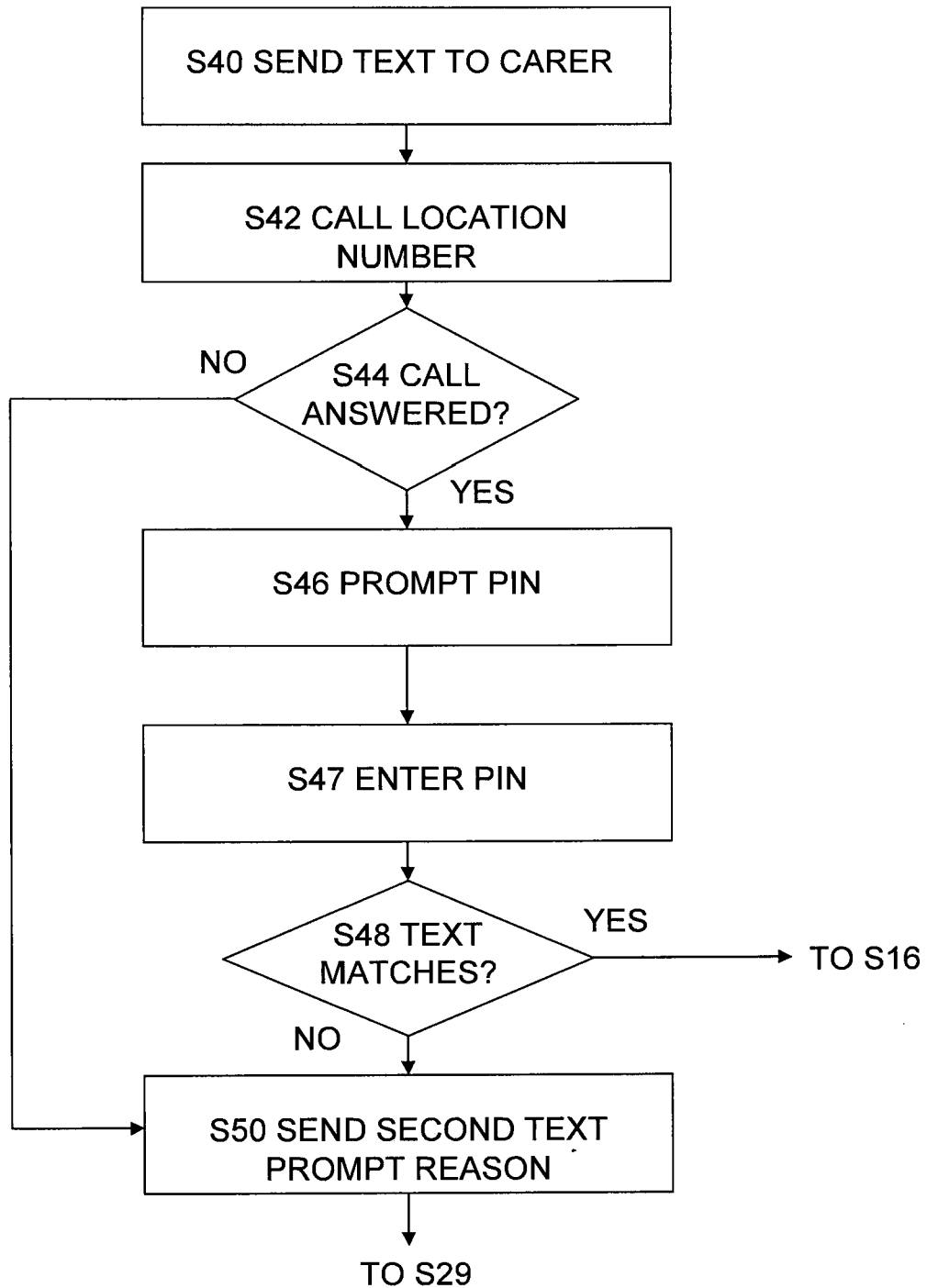
FIG. 8 is a flow chart of a fourth embodiment for performing the location check of the process of FIG. 4.

In FIG. 8 is shown a further process that may be used at step S27 when the relevant location does contain a telephone (preferably a fixed landline based telephone). At step S40 a message is sent to the care worker's mobile telephone number as identified either by CLI (or the input PIN). This message is normally sent as an SMS text message but other forms of message such as email or instant message can be used. The message sent includes a four digit PIN (other numbers of digits may be used and whilst PIN sometimes implies only a purely numerical identifier it is used here to cover any character including text and so that the PIN way be a word) and may be accompanied by instructions informing the care worker of the actions they should take in steps S44 and S46.

After a predetermined delay (e.g. of thirty seconds) following the sending of the message, at step S42 the monitoring system makes a call to a telephone number associated with a telephone of the client that was found in the carer/location details in step S17. This will usually be for a fixed landline telephone in the location 2 of the client. Because of earlier instructions and/or the instructions in the message sent at step S40 the care worker knows that they should answer any call to the client's telephone that is made very shortly after receipt of a relevant message on their mobile telephone 21 and/or shortly after they have made a call in accordance with step S10.

At step S44 it is determined whether the call made in step S42 has been answered. If it has the process proceeds to step S46. If it is not answered within a predetermined time period (e.g. two minutes) then the process proceeds instead to step S50.

At step S46 the system plays a recorded message to the client telephone answered at step S44. The recorded message informs the telephone answerer (which should be the care worker) to enter the PIN that was sent to their mobile telephone 20 via a message. The care worker is then expected to enter the PIN contained in the message sent at step S40, using the keypad of the client telephone. Once entered at step S48 the system reads the PIN entered and checks it against a record of the PIN sent at step S40 to the care worker who reported that they were at the relevant client/location via their call at step S10. If the PINs match then the process continues to step S16 with the location of the care worker having been confirmed. If they do not match the process may proceed to step S50.

At step S50 a second message (again preferably an SMS text message) is sent to the mobile telephone 20 of the care worker. This message informs the care worker that the PIN was incorrect or that the verification call made in step S42 was not answered and asks for an explanation to be given by return message. The care worker may then send a reply message setting out reasons why the call was missed or PIN incorrect. At step S52 any reply message is stored against the records of the care workers alongside data of their visits. The process then proceeds to step S29. Information stored at step S52 can be used to influence what steps if any are taken after step S29.

Because PINs can be incorrectly entered the care worker may be given more than one chance to enter it correctly. Typically they may be given three chances. The likelihood of guessing a four digit PIN in three guesses is very small and is considered low enough to be used for financial transactions. The extra chances can be given through a number of different mechanisms. The care worker may simply be informed in the second message sent at step S50 that they may repeat the whole process starting from step S10. The process is then repeated and the only change to the process on subsequent run-throughs following an incorrect PIN or inability to answer a call is that after the maximum number of attempts (e.g. three) has expired the second message at step S50 no longer gives the care worker the option of trying again but instead informs them that their number of attempts has expired.

Another mechanism is the inclusion in the second message of a request to the care worker to telephone a particular number from the client's telephone and re-enter the PIN. Another alternative is that an incorrect PIN is followed by a repeat of the call at step S42 with the recorded message informing the care worker that the previous call was missed and/or that the PIN was incorrect.

Between step S48 and step S16 the care worker may be informed that the PIN was correct such as by sending a message to the car worker mobile telephone 20 or by the confirmatory ring back process described above with reference to FIG. 4.

If the client's telephone is a mobile telephone rather than a fixed phone connected to a landline this is sub optimal in confirming the location of care worker at step S27. However, whilst the client mobile telephone may be moved from the client location it is unlikely that it will be in possession of the care worker unless they are at the client location. In those circumstances the process in FIG. 8 may still be used as the default process at step S27 but one of the described alternatives may occasionally be used to check the location of the client telephone to check that it is at the client's location when being used to confirm the location of the care worker.

As an alternative the PIN (and preferably the accompanying instructions) may be sent to the client telephone (such as via a recorded message that the care worker listens to) and entered into the care worker's mobile telephone. This alternative can be useful if the client's landline telephone uses a rotary dial rather than DTMF and is therefore not usable to enter a four digit PIN. The system may also allow a user to enter a PIN (even using a rotary dial telephone) verbally and use voice recognition software to determine whether the entered PIN is correct.

An additional or alternative mechanism for verifying the identity of the care worker at step S46, the care worker is asked to provide a voice sample. The care worker is prompted to leave the voice sample after a tone. Voice recognition software is used at step S48 in order to compare the voice sample with a database of voice samples, rather than comparing an entered PIN with text, as previously described. If the samples match, this is recorded, otherwise the carer is asked to provide a reason why the samples do not match and the process moves to step S29. This process is most appropriate when there is a fixed landline.

In an alternative implementation of step S27, a voice sample from the client may be used to verify that the carer is at the appropriate location. This is particularly beneficial in cases where there is no fixed landline. In this case at step S46 a voice sample is requested from the client. The voice sample is to be left after a tone, for example. The voice sample is then compared at step S48, using voice recognition software, with a database of voice samples in order to verify the identity of the person leaving the voice sample. If the samples match, this is recorded, otherwise the carer is asked to provide a reason why the samples do not match and the process moves to step S29.

In a further implementation, voice samples are requested from both the carer and client at step S46. The voice samples are then compared, using voice recognition software, with voice samples in a database at step S48. In the case that both voice samples match corresponding voice samples in the database, the result is recorded. If either of the voice samples does not match voice samples in the database, the carer is asked to provide a reason as to why this is the case and the process moves to step S29.

In alternative implementations of step S27 i/the care worker may be required to answer a telephone call to mobile telephone 20 and give an answer to a question which would be difficult to answer for someone not present or very familiar with the location; ii/a resident may be required to speak a set phrase or word into mobile telephone 20 and have their voice compared to a database of voice samples from residents of locations to be visited, using known voice recognition software, iii/a unique barcode present at the location 2 is required to be photographed by a camera on the mobile telephone 20 and sent in a data file to be compared to a database of barcodes present at locations of clients to be visited, iv/a unique RFID tag is present that the location 2 and required to be read by an RFID reader given to the care worker, which is preferably connected or integral with mobile telephone and the reading may be sent in a data file to be compared to a database of RFID signatures present at locations to be visited. Rather than send a data file in ii/and iv/the photograph and/or RFID reading may seem be time stamped and stored locally such as in data storage integral to the mobile telephone 20. Random occasional checks in accordance with S26 can then be carried out after the event by comparing the location/client that is found to corresponding to the photograph or reading to the matched client details at step S15 for a telephone call (S10) that occurred at the time recorded on the timestamp.

It will be appreciated that features of the individual systems described in relation to the relevant figures can be adapted for use on any one of the system described herein. Beneficially, a system according to the invention can be provided which enables sophisticated call handling in particular in relation to attaching a type of event such as arrival or departure of a carer from a site to data stored in relation to an incoming call thereby to process a further incoming call from the same number depending on the type of previous event. Additionally, a call monitoring system can be provided which enables call handling dependent on the origin of the incoming call such as in relation to an area code such as an STD region, or an actual number thereby for example to enable preferential call handling in a queuing system dependent on the incoming call number.

The word medium is used to refer to any computer readable manifestation of a computer program that can enable a computing apparatus to run as intended. This may preferably be a physical non-transitory storage medium or may be a signal such an electromagnetic signal sent over the internet.

It will be appreciated that a key component of some embodiments of the monitoring systems just described is the application software 14. This software suite can be located into an electronic processor via any suitable readable medium shown at 8 in FIG. 1.

Further, the computer program can be obtained in electronic form for example by downloading the code over a network such as the Internet.

With reference to FIGS. 5 to 8 there are shown embodiments of location checking equipment and processes used for performing step S27.

Figure 5:
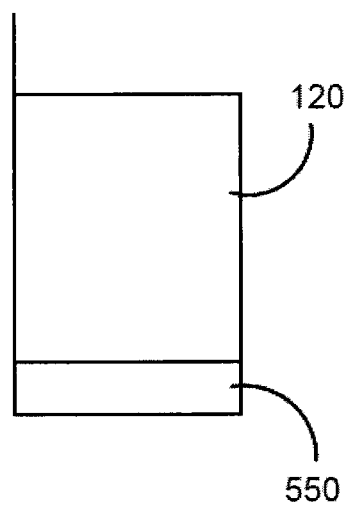
FIG. 5 is an embodiment of hardware for performing the location check of the process of FIG. 4.

In FIG. 5 is shown a phone 110 substantially similar to phone 20 but also including a GPS (Global Positioning System) device 550. Instead of GPS similar radio navigation/positioning devices might be used such as devices configured to use Galileo.

When step S27 takes place the GPS location of the phone 20 is measured by device 550 and transmitted to the apparatus 10 by SMS text message or other suitable means. This is achieved by suitable programming of the phone 20 processor, the programs for which may be downloaded from computer 4 via communicator 7.

On receipt of the GPS data at computer 4, the application software 14 translates the GPS related data in to a form corresponding to location data stored in the database 5 It is then possible to check whether the location calculated from the number dialled by the care worker at step S17 actually corresponds to the GPS information relating to the same building in the database 5 at step S28.

The frequency with which step S27 is taken can be varied and optionally may always be taken, making step S26 redundant. Presently use of GPS and a text message is likely to increase costs and therefore might be used sparingly. Even if used very sparingly making the application of the check random means that care workers will still risk being caught if attempting to cheat the system by remembering/storing numbers corresponding to certain locations 2, 3 and calling these numbers even when at a different location.

Instead of GPS or other radio navigation known methods of radiolocation detection by base transceiver station 12 triangulation/trilateration can be used. Such methods have been publicly described and include use of angle of arrival, time difference of arrival and/or location signatures. Radiolocation using the mobile network 1 has the advantage that the mobile phones 20 do not require GPS devices 550. However such radiolocation may still incur charges from the mobile telephony operator and may require a text message or similar to transmit the data to computer 4.

Figure 6:
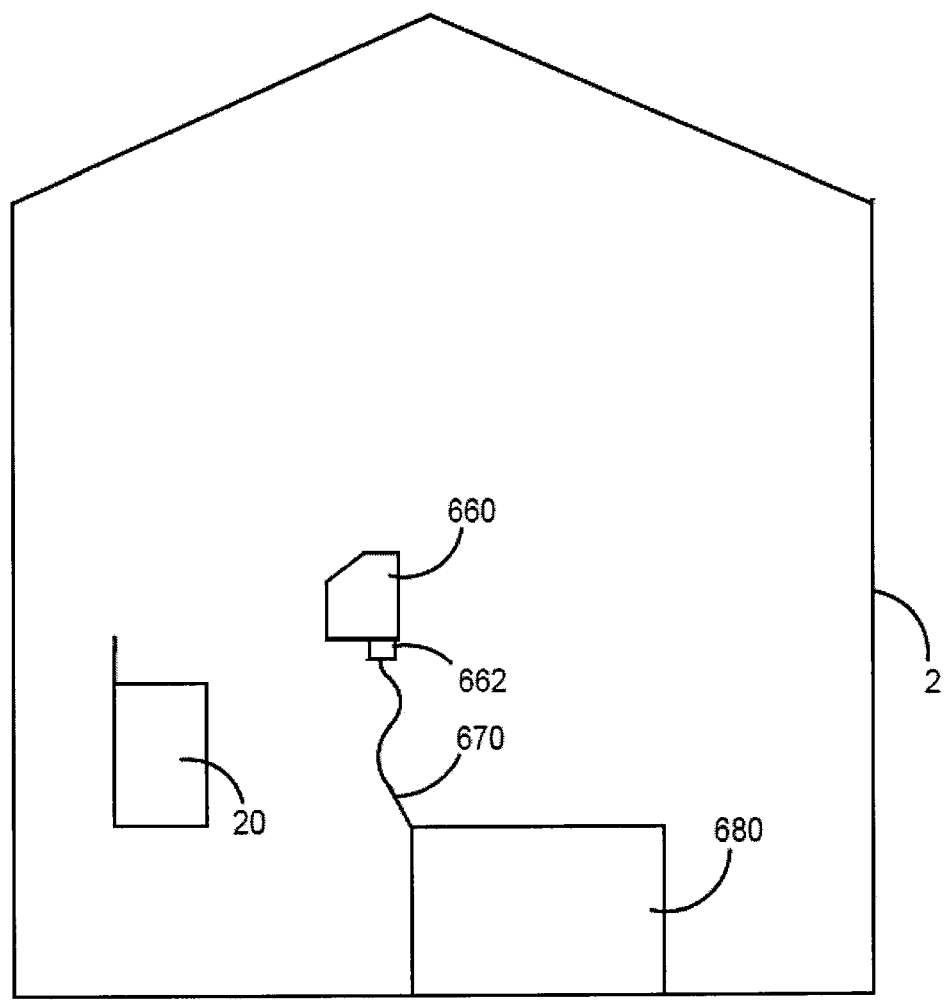
FIG. 6 is a second embodiment of hardware for performing the location check of the process of FIG. 4.

Another embodiment of implementing step S27 is shown in FIG. 6. As shown, in location 2 is a SIM card 660 attached to a wire 670 at connection point 662, where wire 670 is in turn permanently attached to an item of large furniture 680 or to a wall. The SIM card may be provided as a free "pay as you go" card available from mobile telephone companies and will have its own unique number At connection point 662 the wire 670 may be permanently fixed to the SIM card such as by having the card overmoulded around the end of the wire 670. Alternately connection point 662 may comprise a security device tab or sensor (such as the device sensor described in GB2287339) which triggers an alarm if the SIM card 660 and wire 670 are separated.

Using this embodiment, at step S27 the care worker makes a further call to the exchange 9 but with the SIM card 660 inserted in their phone 10. Accordingly using CLI the computer 4 can recognise the number corresponding to the SIM card 660 and therefore to the location 2, and then compare this to entries in database 5. By ensuring that each number corresponding to a SIM card 660 fixed in a location is entered into database 5 alongside the details of each location without a landline step S27 can be completed, As an alternative to using this embodiment at step S27, it can be used on every visit to the location. In that case a known approach to identifying a care worker and location as described in WO02/45494 (such as in FIG. 6) can be used but using a mobile phone 20 with SIM card 660 rather than a landline telephone though some of the advantages of using mobile telephones may then be mitigated.

Should phones 19, 20, 21, 22 be used for which it is difficult to use a SIM card with connection point 662 (e.g. where the SIM card holder is located beneath a battery and the battery is required to be in place to make calls) the SIM 660 may be provided unattached. This is generally considered less preferable since a care worker may mistakenly or deliberately move the SIM away from its appropriate location.

Figure 7:
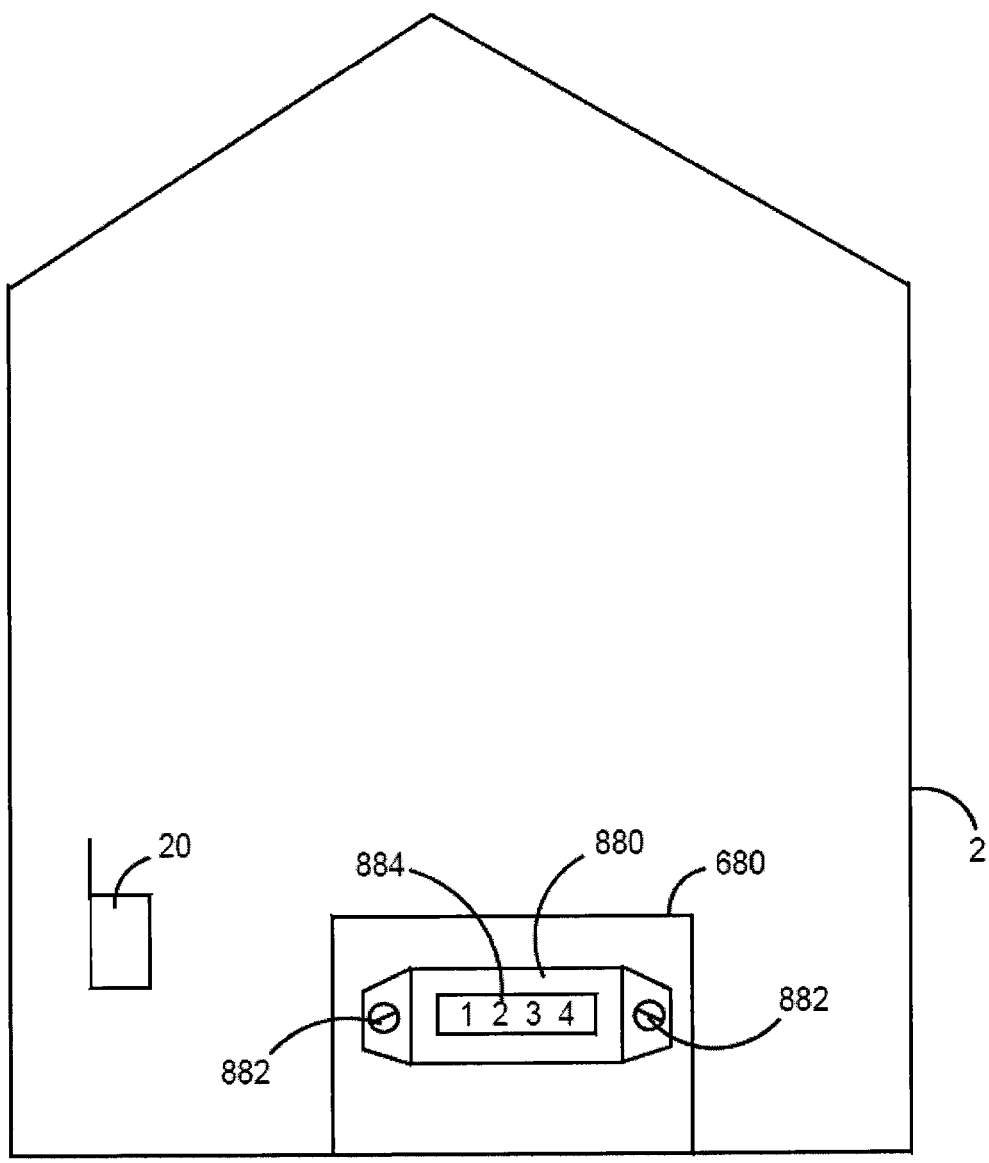
FIG. 7 is a third embodiment of hardware for performing the location check of the process of FIG. 4.

In FIG. 7 is shown another embodiment for operating step S27. In this embodiment a security/authentication token 880 is provided which is attached by fasteners 882, such as screws, or by glue to a wall or heavy furniture 680.

The token 880 displays, on a display 884, a different number, with a predetermined number of digits, every time a button is pressed or every time a fixed time period (e.g. one minute) expires. The sequence of numbers displayed by the token 880 is determined by an algorithm (such as a one way hash chain) understood only by application software 14 or by a third party computer in communication with the computer 4. Suitable tokens and algorithms are known for authentication of an individual (such as RSA's SecureID or VeriSign or Vasco DigiPass) but have not previously been used for identification of a location. The embodiment shown in FIG. 7 allows such a token 880 to identify the location.

Using the embodiment at step S27 the care worker may be required to press a button on the token 880 or simply read the number at the appropriate time in order to obtain a number. The care workers then texts (or communicate by other similar method) the number they read for the token display 884 to the computer 4 calling the number corresponding to the location 2. Using the algorithm stored for the location 2 identified by CLI from database 5 it can be determined by application software 14 if the number in the text corresponds to the number that ought to be being displayed by the token 880 at that time. This number can only be known by a person able to press the button and/or read the display of the token 880 and since the fasteners 882/glue assures that the token 880 stays at the correct location, the care worker who enters the correct number in the text must be at the correct location 2.

In a further embodiment of step S27, the location 2 is determined by the token 880 implementing an algorithm that displays on the display 884 the last four digits of the telephone number the worker has to telephone in order for the computer 4 to determine their location. The organisation running the system would have purchased a number of free phone numbers of the same format, say 0800 123 ####, where the last four digits vary.

In the example shown in FIG. 7 the display 884 shows the numbers "1234". In this embodiment the worker would dial the free call number of the format 0800 123 ####, where #### is determined by the number displayed on the display 884. Therefore, the worker would telephone 0800 123 1234. The token is programmed, preferably with a unique key or seed (for example a one way hash function) using the built in clock of the token 880, to display the four digits, which would change at a pre-set time interval, preferably one minute. The four digit number displayed would also need to correspond to a valid free call number, which would be reflected in the algorithm undertaken by the key.

The key or seed for each token 880 would be known to the central computer 4, and therefore the number displayed at on the display 884 at location 2 at a particular time would be known to the computer 4. The user calls the displayed number, and is identified as described above, using the number dialled and the time the computer 4 is able to determine at which location the number was displayed and therefore the location of the user.

Ideally, there are an equal number or more available free call numbers than there are subscribers to the system. In such a scenario the algorithm used to generate the number would ensure that the number displayed at a house at a particular time is unique in that moment of time. This would allow the computer 4 to determine the location of the caller with certainty. However, in practice the cost of purchasing the numbers or the availability of the numbers may mean that a particular number is displayed in two or more houses at the same time.

However, the identification of the location can be further aided by the fact that the user has to telephone twice during a visit to a location, at the start and at the finish of their visit. As the key used to generate the numbers for each token 880 is preferably unique, the chances of the same number appearing twice at two or more locations at the same time become much smaller (dependent of course on the number of lines available, the number of users, the key used etc.) thereby allowing the location to be determined with a high degree of certainty.

In the event that there is an overlap the predicted user location information, or mobile base tower information may also be used. For example, two separate locations 2 may display the same number to call at a given time with one number assigned to a house in Birmingham and the other to a house in London, the computer 4 would be programmed to recognise that it is unlikely that the user who is expected to be in Birmingham would be in London and therefore be able to identify the user from the predicted location. This may additionally be supplemented by information from the user's mobile telephone, such as nearest cell phone tower or the base station through which the call has been routed. Other methods for determining an approximate (or accurate) location of a mobile telephone such as phone mast triangulation, GPS tracking etc may also be used.

In a further embodiment, the changes to the number displayed may follow a set sequence, which would be programmed in the token 880 and known to the central computer 4. Preferably, the set sequence of numbers is non-obvious to prevent a user from predicting what a number would be at a given time to prevent a user from potentially subverting the system. The use of set sequence of numbers has advantages in determining the location of a user. A particular set sequence may be used to cover all locations (where the number of locations is less than or equal to the number of available telephone lines) in a geographical area, where the starting point of the sequence being different for each location. This ensures that within a defined geographical area no two locations show the same number at the same time. The computer 4 then uses the expected location of the user to determine which geographical area from which they are calling. Again, those skilled in the art would realise that if different sequences are used in different geographical locations, the likelihood of the same number being displayed at two locations when a user enters and leaves the location becomes much smaller.

Whilst the above embodiment preferentially has a set number with the final four digits that vary, the number, and position, of digits that vary may be changed without deviating from the general principle of the invention. However, given the number of subscribers to a system and the costs involved in purchasing large numbers of telephone numbers four digits is the preferred option.

As an alternative to infrequent uses of the token 880 at step S23 and the cost of a text, each relevant location 2, 3 (such as all locations without a landline) may be given a significant number of telephone numbers corresponding to them, with each of these number stored in the database 5 alongside the client and location details. Part of these telephone numbers e.g., the first three digits may be identical for each location 2, 3 with the other digits (e.g. four digits) being different. The token 880 in location 2 may then use an algorithm which makes the token display 884 swap between that location's associated telephone numbers in a sequence only known by the computer 4 or third party computer in secure communication. The care worker may then be instructed that at step S8 they should call a number comprising the first three digits of the location 2 and the digits displayed on token 880 (e.g. at the correct time or after pressing a button). At step S17 the computer 4 then identifies the location 2 from the database 5 and also checks that the number dialed is at the valid point in the sequence of numbers. This latter step prevents a care worker simply remembering numbers and dialing them from a different location since they do not know which number will be expected in the sequence.

In order to prevent a very large number of telephone numbers being required, some locations 2, 3 may share some of the same numbers provided they are at different points in the sequence cycle. Where the number on the tokens 880 changes on a press of a button on each visit, this has the disadvantage that if the locations are visited a different number of times then two locations could end up out of phase in their sequence so that they both use the same shared number at the same time. By analysing the official visit schedule before calculating the order of the sequences this possibility can become very unlikely. Even if it is to occur it is unlikely to cause a large problem for location verification since the care workers will not know when and where the number sharing will occur. The chances of a care worker actually being at location 2 whilst pretending to be at location 3, and it being location 2 and 3 that share the same generated number at that point in time are very small.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A monitoring system for monitoring incoming telephone calls, including telephone calls with different called numbers, the system comprising an electronic processor and an associated database containing caller details with corresponding telephone numbers and/or caller voice samples, details regarding locations and/or people to visit with corresponding first telephone numbers;
    wherein the monitoring system is adapted to:
    detect the called number to which an incoming call was made;
    detect the originating number and/or the voice of a caller making the incoming call,
    to store the time, date and number of the incoming call and store data representing the number to which the incoming call was made;
    to identify the identity of the caller corresponding to the originating number and/or voice by referring to caller details in the associated database,
    to identify the location of the caller/person being visited by the caller corresponding to the detected called number by referring to the first telephone numbers in the associated database, and for at least some of the detected incoming calls,
    to call a number in the associated database,
    to receive a voice sample in response to the outgoing call, and to determine if the received voice sample from the outgoing call matches a voice sample stored in the associated database.

2. The monitoring system of claim 1, wherein the detail regarding locations and/or people to visit include corresponding location/people to visit voice samples and the system is adapted to determine if the received voice sample from the outgoing call matches the location/people to visit voice sample corresponding to the identified location of the caller/person being visited.

3. The monitoring system of claim 1,
    where the associated database contains secondary telephone numbers for at least some of the locations/people to visit,
    the system being adapted so that the outgoing call is a call to the secondary number corresponding to the identified location of the caller/person being visited.

4. The monitoring system of claim 2, the system adapted so that the outgoing call is a call to the number in the associated database corresponding to the caller.

5. The monitoring system of claim 2, wherein the system requests via the voice sample via the outgoing call and requests that it is from the person being visited/someone resident at the identified location rather than the caller.

6. The monitoring system of claim 3, wherein the system is adapted to determine if the received voice sample from the outgoing call matches caller voice sample corresponding to the identified identity of the caller.

7. A monitoring system for monitoring incoming telephone calls, including telephone calls with different called numbers, the system comprising an electronic processor and an associated database containing caller details with corresponding telephone numbers and/or voice samples and details regarding locations and/or people to visit with corresponding telephone numbers, the system being adapted to:
    detect the called number to which an incoming call was made;
    detect the originating number and/or the voice of a caller making the incoming call,
    to store the time, date and number of the incoming call and store data representing the number to which the incoming call was made;
    and to identify the location of the caller/person being visited by the caller corresponding to the detected called number by referring to the associated database, and to identify the identity of the caller corresponding to the originating number and/or voice by referring to the associated database.

8. A monitoring system for monitoring incoming telephone calls, including telephone calls with different called numbers, the system comprising an electronic processor and an associated database containing caller details with corresponding telephone numbers and details regarding locations and/or people to visit with corresponding telephone numbers, the system being adapted to:
    detect the originating number of a caller and the called number to which an incoming call was made;
    to store the time, date and number of the incoming call the originating number of which has been detected and store data representing the number to which the incoming call was made;
    and to identify the location of the caller/person being visited by the caller corresponding to the detected called number by referring to the associated database, and to identify the identity of the caller corresponding to the originating number by referring to the associated database.

9. The monitoring system of claim 8, wherein if the identified caller is identified for the first time and/or if the identified caller does not have a corresponding voice sample in the associated database the system is adapted to receive a voice sample from the caller and store a corresponding voice sample in the associated database associated with the identified caller.

10. The monitoring system of claim 8, wherein if the identified location/person being visited is identified for the first time and/or if the identified location/person being visited does not have a corresponding voice sample in the associated database the system is adapted to receive a voice sample, such as from the person being visited or resident at the location, and store a corresponding voice sample in the associated database associated with the identified location/person being visited.

11. The monitoring system of claim 8, comprising a plurality of mobile phones the monitoring system configured to monitor incoming telephone calls from the mobile telephones including calls with different called numbers.

12. The monitoring system of claim 8, wherein the associated database contains secondary corresponding telephone numbers for at least some of the locations and/or people to visit, for at least some of the detected incoming calls the system is adapted to call the secondary number corresponding to the identified location of the caller/person being visited, and is adapted to receive an input from the caller in response to the call to the secondary number, to compare the received input with an expected received input and check they correspond.

13. The system according to claim 12, wherein the input and expected input are in the form of a PIN and the input is received via the telephone that received the call to the secondary number.

14. The system according to claim 12, adapted to send the expected input to the caller, prior to receiving the input, using the originating number of the caller.

15. The system according to claim 13, wherein the expected PIN is sent by text message.

16. The monitoring system of claim 8, wherein the telephone calls, including telephone calls with different called numbers, are routed through a call transference system for transferring the calls with different called numbers to a single number destination, the system being adapted to detect the originating number of the caller and the called number to which the incoming call was made before being transferred to the final destination.

17. A monitoring system according to claim 8, comprising a locator adapted to locate the physical position of the caller when the call was made for at least some incoming calls.

18. A monitoring system according to claim 17, wherein the processor is configured to compare the location information from the locator with the identified location and/or the identified person to visit and check that they correspond.

19. A monitoring system according to claim 14 wherein the locator is configured to receive data from a radio navigation unit such as a gps unit in a mobile telephone.

20. A monitoring system according to claim 17, wherein the locator comprises a processor that calculates location based on base transceiver station triangulation/trilateration.

21. A monitoring system according to claim 17, comprising a plurality of number displaying devices located at one or more of the locations and/or with a person to visit, which devices display a plurality of numbers in a sequence, the system configured to receive at least part of a number displayed by a number displaying device from the caller, the locator adapted to identify the physical location of the caller, or the person to visit they are located near to, by comparing the received at least part of a number displayed, with a number expected to be displayed by at least one of the devices at a location and/or with a person to visit, the expected number being stored in the database or generated by an algorithm stored in the database and used by the device to generated the sequence.

22. A monitoring system according to claim 21, wherein the system is configured to receive at least part of the displayed number by text message, preferably an SMS text message.

23. A monitoring system according to claim 22, wherein the database includes a plurality of corresponding telephone numbers for each location and/or person to visit, at least some of the corresponding numbers including at least part of an expected number and the system is configured to receive at least part of a number displayed by a number displaying device from the caller as part or all of the detected called number to which the incoming call was made.

24. A monitoring system according to claim 21, wherein one or more of the devices comprises fixing elements such as fasteners or glue for keeping them in place at a given location.

25. The system according to claim 8, wherein the system is adapted to detect the caller, identify location and identify identity of caller for a plurality of incoming calls and only to compare the identified location with the location information from the location and/or making the outgoing calls, such as to a secondary number, for a fraction, (preferably less than half) of the incoming calls for which locations and caller identities are identified.

26. A system according to claim 8, adapted to compare a called number with a visit schedule of users stored in said database so as to identify a location and/or person being visited.

27. A system according to claim 8, wherein the processor is adapted to compare the number of an incoming call with stored numbers so as to match the parameters of an incoming call with stored data to determine the origin of the call from which the call was made, and to compare the time and date of a matched number with a visit schedule stored on said database representing the expected times and dates at which callers should visit predetermined sites.

28. A system according to claim 8, wherein the processor is adapted to generate data indicating matched numbers and indicating compliance or not of the times and dates of matched numbers with a visit schedule stored on said database representing the expected times and dates at which callers should visit predetermined sites.

29. A monitoring system according to claim 8, adapted to automatically generate a call in response to any incoming call the originating and called numbers of which have been identified preferably without answering the incoming call.

30. A monitoring system according to claim 8 adapted to identify the location of the caller/person being visited by the caller corresponding to the detected called number by referring to the associated database, and to identify the identity of the caller corresponding to the originating number by referring to the associated database without answering a call.

31. The monitoring system of claim 8, further comprising one or more displays at one or more locations suitable for displaying the whole or part of part of a telephone number wherein;

the whole or part of a telephone number displayed at a given location is determined by a known and/or predetermined sequence, said sequence is also known to the system thereby allowing the displayed number to be associated with one or more known locations at a given time.

32. A method of monitoring incoming telephone calls, including telephone calls with different called numbers, the method including the steps of detecting the originating number of the caller and the called number to which the incoming call was made; storing the time, date and number of an incoming call the originating number of which has been detected and storing data representing the number to which the incoming call was made; identifying the location of the caller/person being visited by the caller corresponding to the detected called number by referring to a database, and identifying the identity of the caller corresponding to the originating number by referring to a database.

33. A method according to claim 32, wherein the whole or part of the telephone number to be called is displayed at a location to be visited according to a known and/or predetermined sequence, said sequence is also known to the system wherein:

the number displayed at the location is called and the location of the caller is determined by identifying the number called and comparing the number to said known sequences to determine the one or more locations at which the called number was displayed at the time of the call.

34. A method of claim 33, wherein the sequence is unique for each location at which the number is displayed.

35. A method according to claim 33, wherein further information such as the expected location of the caller is used to determine the location of the call.

36. The system according to claim 12, wherein the secondary number is the number of a landline or mobile telephone located at the corresponding location/with the corresponding person to be visited.

37. The system according to claim 12, wherein the input and expected input are in the form of voice data and the system is adapted to use voice recognition software to compare the received voice data to expected voice data such as a pre-recoded message made by the caller and stored in the associated database.

38. The system according to claim 6, wherein the system is adapted to answer the incoming call and play a message.

* * * * *